United States Patent [19]

Patterson

[11] Patent Number: 4,714,737

[45] Date of Patent: Dec. 22, 1987

[54] PROCESS AND COMPOSITION

[75] Inventor: Dwight J. Patterson, Evansville, Ind.

[73] Assignee: General Electric, Mt. Vernon, Ind.

[21] Appl. No.: 943,460

[22] Filed: Dec. 19, 1986

[51] Int. Cl.$^4$ .......................... C08L 69/00; C08J 3/00
[52] U.S. Cl. ...................................... 524/611; 523/217
[58] Field of Search .......................... 524/611; 523/217

[56] References Cited

U.S. PATENT DOCUMENTS

| | | | |
|---|---|---|---|
| 4,242,215 | 9/1980 | Macke | 524/611 |
| 4,357,271 | 11/1982 | Rosenquist | 524/611 |
| 4,460,733 | 7/1984 | Carter, Jr. et al. | 524/611 |
| 4,638,027 | 1/1987 | Mark et al. | 524/611 |
| 4,661,555 | 4/1987 | Koga et al. | 524/611 |

Primary Examiner—Morton Foelak
Attorney, Agent, or Firm—Martin B. Barancik

[57] ABSTRACT

A method for producing a high molecular weight aromatic polycarbonate composite material which comprises a. coating the reinforcing material with a catalyst system which polymerizes aromatic cyclic carbonate oligomers to high molecular weight aromatic polycarbonate under appropriate conditions;

b. contacting the catalyst system coated reinforcing material with a mixture of aromatic cyclic carbonate oligomers and;

c. polymerizing the mixture of aromatic cyclic carbonate oligomers to high molecular weight aromatic polycarbonate.

6 Claims, No Drawings

PROCESS AND COMPOSITION

BACKGROUND OF THE INVENTION

Recently there has been significant focus on the preparation of various polymers from their oligomeric structures. Generally the oligomeric structures have better flow properties than the final polymer and therefore can be used to make various articles where the initial flow is a significant feature of the article. For example, in composite formation the flow of the oligomer is a significant feature in filling the mold and wetting the reinforcing material.

Attention has been focused on the use of cyclic carbonate oligomers for preparing polycarbonate. By using mixtures of cyclic carbonate oligomers, the softening point of the oligomers is of a sufficiently low temperature that various commercial uses of the cyclic carbonate oligomers are now possible. These uses particularly include the preparation of high molecular weight polycarbonate composite materials. These materials can be used in various applications wherein the general strength and toughness of the polycarbonate is added to by the reinforcing material so that an extremely high modulus is also achieved. The typical method of preparing the polycarbonate composite is to prepare the cyclic carbonate oligomers, add a polymerization catalyst system to the oligomers, add the oligomers to a specific reinforcing material, and raise the temperature to set off the polymerization catalyst system so as to form the high molecular weight polycarbonate resin composite.

This particular method, however, has some problems since the actual catalyst system can make the high molecular weight polymers in less than three minutes at 300° C. Because of this rapid build up in molecular weight, it is considered quite difficult to mold large reinforced particles in an injection molding machine, pultrusion equipment or on the usual equipment used to mold thermoplastic composites due to the short polymerization time.

A new method has been discovered which increases the polymerization time and therefore allows the composite materials to be prepared in the usual commercial apparatuses. In this method the catalyst system is not dispersed within the cyclic carbonate oligomer but is impregnated upon the reinforcing material. This increases the amount of time necessary to bring about the actual polymerization of the oligomer to the high molecular weight polycarbonate. Interestingly, even though the catalyst system is not dispersed within the cyclic carbonate oligomer, the preparation of the high molecular weight polycarbonate is uniform or at least substantially uniform throughout the material, even at the edges of the molded article.

BRIEF DESCRIPTION OF THE INVENTION

In accordance with the invention there is a method for producing a high molecular weight polycarbonate composite material which comprises a. coating the reinforcing material with a catalyst system which polymerizes aromatic cyclic carbonate oligomers to high molecular weight aromatic polycarbonate under appropriate conditions;

b. contacting the catalyst system coated reinforcing material with a mixture of aromatic cyclic carbonate oligomers and;

c. polymerizing the mixture of aromatic cyclic carbonate oligomers to high molecular weight aromatic polycarbonate.

A further aspect of the invention is a reinforcing material coated with a catalyst system which can convert cyclic carbonate oligomers to high molecular weight aromatic polycarbonate.

DETAILED DESCRIPTION OF THE INVENTION

The mixture of aromatic cyclic carbonate oligomers useful in this invention are well described in EPO Pat. No. 162379, laid open on Nov. 27, 1985 and issued to General Electric Company, and incorporated by reference. The amount of linear oligomer or high molecular weight polycarbonate which may also be present with the aromatic cyclic carbonate oligomers is not critical to the invention.

As is readily apparent, any diphenol which results in an aromatic polycarbonate under appropriate reaction conditions can be employed to prepare the mixture of cyclic carbonate oligomers. Dihydric phenols useful to make the mixture of cyclic carbonate oligomers include those of the formula

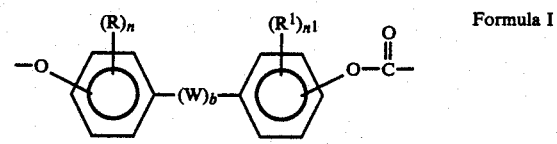

Formula I wherein:
R and $R^1$ are independently selected from monovalent hydrocarbon radicals, monovalent hydrocarbonoxy radicals, and halogen radicals;
W is selected from divalent hydrocarbon radicals,

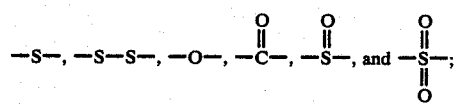

n and $n^1$ are independently selected from integers having a value of from 0 to 4 inclusive;
and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula —$OR^2$ wherein $R^2$ is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 6 to about 16 ring carbon atoms.

Some illustrative non-limiting examples of dihydric phenols falling within the scope of Formula I include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
2,2-bis(3-bormo-5-methyl-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)decane;
1,4-bis(4-hydroxyphenyl)butane;
bis(4-hydroxyphenyl)methane;
4,4'-thiodiphenol; and
bis(4-hydroxyphenyl)ether.

Other dihydric phenols which are useful are described in U.S. Pat. Nos. 2,998,835; 3,028,365 and 3,335,154, all of which are incorporated herein by reference.

The method of preparing the mixture of aromatic cyclic carbonate oligomers is not critical to the invention and is well described in the aforementioned application incorporated by reference, EPO Pat. No. 162379. It should be noted that a mixture of cyclic carbonate oligomers includes the same dihydric phenol wherein there is more than a single repeat number as well as a mixture of oligomers made from different dihydric phenols or even a co-cyclic carbonate oligomer having different repeat numbers and different amounts of the various dihydric phenols in the oligomer.

Once prepared, the mixture of cyclic carbonate oligomers is then contacted with the polycarbonate polymerization catalyst system coated reinforcing material. The catalyst system is applied to the reinforcing material in any conventional manner so as to achieve a bond between the catalyst system and the reinforcing material. A typical technique is to coat or impregnate the reinforcing material with a solution of the catalyst system and then remove the catalyst system solvent by evaporation. Another convenient method is to spray coat the catalyst or initiator onto the reinforcing material.

The reinforcing material can be any material non-reactive to the aromatic polycarbonate polymer or essentially non-reactive reinforcing material which "reinforces", i.e. brings added strength as measured by a higher modulus or tensile strength to the composition. Examples of such materials include but are not limited to glass, aromatic amide, mica, carbon, calcium carbonate, ceramic, and mixtures thereof and the like. The physical forms which the reinforcing material can take also vary substantially and may be any form which actually provides reinforcement. Examples of such forms include spheres, fibers, strands, chopped fibers, whiskers, indiscriminate particles, flakes, mats and the like.

The catalyst system families which can be employed to coat the reinforcing material generally include the catalyst system which catalyze the transesterification reaction in the melt of bisphenol-A and diphenyl carbonate to aromatic polycarbonate. The term catalyst system as used throughout this specification and claims includes both the initial catalyst species added to the formulation and catalytically active species to which it may be converted, by for example ligand exchange reactions, during the polymerization process. The material activates the polymerization reaction but is not consumed or modified.

Examples of such catalyst systems are generally regarded as Lewis acids or Lewis bases. Examples of Lewis acids effective for polymerizing cyclic carbonate oligomers to high molecular weight polycarbonates include aluminum chloride, stannic chloride, dioctyl tin oxide, titanium tetraalkoxides, and the like. Examples of Lewis bases include tetraarylborate salts, tetrabutylammonium tetraphenylborate, basic salts such as sodium benzoate, lithium stearate, lithium hydroxide, sodium carbonate and metal hydrides such as aluminum hydride.

The quantity of catalyst system which is present on the reinforcing material is that amount which is effective to polymerize the aromatic cyclic carbonate oligomer to aromatic polycarbonate. Generally this can be from about 0.001 to 0.5 mole percent of the aromatic cyclic carbonate oligomer added to the reinforcing material, preferably from about 0.005 to 0.1 mole percent. Mole percent is defined as ratio of moles of catalyst present to moles of oligomer repeat unit present times 100. The most important aspect of the catalyst quantity is to have sufficient amount to catalyze the complete polymerization of the oligomers to the high polymer. By high polymer is meant a polycarbonate having an intrinsic viscosity of at least 0.3, preferably 0.4 as measured at 25° C. in methylene chloride.

Below are examples of the invention. These examples are intended to illustrate the broad scope of the invention. They are not intended to limit the broad scope.

EXAMPLE 1

A. COATED REINFORCING MATERIAL

A methylene chloride solution containing 1.2 mg/ml of tetrabutylammonium tetraphenylborate is prepared. 50 mls of this solution is placed upon and covers a woven glass mat 324 woven roving, 24 oz. per square yard, obtained from Certainteed Corporation, the glass mat having dimensions of 6"×6" and weighing approximately 17.7 g. The impregnated woven glass mat is contacted with the methylene chloride solution for a period of one minute. Residual solvent is removed and the wet mat is heated for a period of five minutes at 110° C.

B. PREPARATION OF A GLASS MAT REINFORCED POLYCARBONATE

Seventy grams of bisphenol-A cyclic carbonate oligomer mixture, 0.10 intrinsic viscosity in methylene chloride at 25° C. was divided into three equal portions. One portion of the cyclic resin (23.3 g) was placed in a 6"×6" compression mold. A glass mat as prepared in A. above was placed on top of the resin. Further portions of the bisphenol-A oligomer (23.3 g) and coated glass mats of A. were interlayered until a five layer geometry structure of resin (3 layers) and mat (2 layers) resulted. The sandwich was enclosed in the 6"×6" compression mold. The mold was transferred to a hot compression press and heated to 300° C. The mold was held at 300° C. for 10 minutes with 2 tons of pressure being applied. The mold was removed to a cooling press with 2 tons of pressure applied. The composite plaque was cut in a fashion such that a sample could be taken from the edge and center regions. The polycarbonate resin was recovered from the edge sample and center sample by dissolving the plaque in $MeCl_2$. The recovered resin was analyzed by GPC. The molecular weight results are listed:

|  | Mn | Mw | POLYDISPERSITY |
|---|---|---|---|
| Center of plaque | 40,695 | 115,685 | 2.8 |
| Edge of plaque | 54,608 | 129,392 | 2.4 |

The molecular weight is with respect to polystyrene GPC standards.

The GPC data shows the polymerization to be complete and that high polymer was obtained throughout the geometry of the plaque.

C. Following the procedure in B. but using four layering glass mats and five portions of bisphenol-A cyclic carbonate oligomer, the oligomer was polymerized to high molecular weight polycarbonate. The final molecular weight of the polycarbonate resin in the composite plaque was found by GPC to be

| Mn | Mw | POLYDISPERSITY | I.V. |
|---|---|---|---|
| 13,900 | 49,100 | 3.54 | .82 |

Molecular weight corrected for polycarbonate.

The data shows that the cyclic carbonate oligomer mixture has polymerized to high molecular weight polycarbonate.

What is claimed is:

1. A method for producing a high molecular weight aromatic polycarbonate composite material which comprises
   a. coating the reinforcing material with a catalyst system which polymerizes aromatic cyclic carbonate oligomers to high molecular weight aromatic polycarbonate under appropriate conditions;
   b. contacting the catalyst system coated reinforcing material with a mixture of aromatic cyclic carbonate oligomers and;
   c. polymerizing the mixture of aromatic cyclic carbonate oligomers to high molecular weight aromatic polycarbonate.

2. The method in accordance with claim 1 wherein the aromatic cyclic carbonate oligomer is bisphenol-A.

3. The method in accordance with claim 1 wherein the catalyst system is tetra butyl ammonium tetra phenyl borate.

4. The method in accordance with claim 1 wherein the reinforcing material is glass.

5. The method in accordance with claim 4 wherein the glass is in fibrous form.

6. The method in accordance with claim 4 wherein the glass is in mat form.

* * * * *